(12) United States Patent
Fahley

(10) Patent No.: US 6,293,029 B1
(45) Date of Patent: Sep. 25, 2001

(54) MEASUREMENT INSTRUMENT FOR COMPONENTS OF A VOICE COIL MOTOR

(75) Inventor: Terry R. Fahley, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/141,395

(22) Filed: Aug. 27, 1998

(51) Int. Cl.$^7$ .................................................. G01D 21/00
(52) U.S. Cl. .................................................. 33/645; 33/613
(58) Field of Search .................. 33/613, 645, 501.45, 33/555.1, 555.2, 1 M, 503, 533, 666; 411/426

(56) References Cited

U.S. PATENT DOCUMENTS

| | | | |
|---|---|---|---|
| 2,715,281 | * | 8/1955 | Black .................................. 33/501.45 |
| 2,896,333 | * | 7/1959 | Kivela .................................. 33/555.2 |
| 4,662,075 | * | 5/1987 | Mastel et al. ........................ 33/628 |
| 5,152,073 | * | 10/1992 | Sloan .................................. 33/666 |
| 5,257,091 | * | 10/1993 | Caicedo, Jr. et al. ................ 33/358 |
| 5,501,020 | * | 3/1996 | Welt .................................... 33/555.2 |
| 5,537,270 | * | 7/1996 | Morehouse et al. ................. 360/97.02 |
| 5,625,515 | * | 4/1997 | Brown ................................. 360/97.01 |
| 5,760,500 | * | 6/1998 | Kondo et al. ........................ 33/1 M |
| 5,863,167 | * | 1/1999 | Kaneko ................................ 411/426 |
| 5,907,453 | * | 5/1999 | Wood et al. .......................... 360/97.02 |
| 5,953,178 | * | 9/1999 | Takatsuka et al. .................. 360/77.02 |
| 5,960,550 | * | 10/1999 | Weir et al. ........................... 33/28 |
| 5,966,271 | | 10/1999 | Fahley ................................. 29/603.03 |
| 6,038,779 | * | 3/2000 | Lee et al. ............................. 33/1 M |

* cited by examiner

Primary Examiner—Christopher W. Fulton
(74) Attorney, Agent, or Firm—Westman, Champlin & Kelly, P.A.

(57) ABSTRACT

An instrument for measuring alignment of a magnet relative to a pole plate for a voice coil motor of a disc drive. The instrument includes a base and a platform coupled to the base and adapted to support a plate. The platform including a platform hole. A set of incrementally sized pins are included. The set of incrementally sized pins have incremental diameter dimensions to provide a selection of pins for insertion through plate hole and platform hole to match the dimension of the pin relative to the actual plate hole dimension to limit movement of the plate and magnet during measurement to reduce measurement errors.

19 Claims, 8 Drawing Sheets

MEASUREMENT INSTRUMENT FOR COMPONENTS OF A VOICE COIL MOTOR

FIELD OF THE INVENTION

The present invention relates to a data storage system. In particular, the present invention relates to a device for measuring alignment of components of a magnet assembly for a voice coil motor.

BACKGROUND OF THE INVENTION

A disc drive includes a plurality of stacked discs which are rotationally supported relative to a disc spindle and an actuator assembly movably supporting a plurality of head gimbal assemblies for reading and writing data to the discs. The actuator assembly includes an actuator drive typically a voice coil motor for actuating the head gimbal assemblies relative to selected data tracks of the discs.

The voice coil motor includes a magnet assembly defining a permanent magnetic field and a energizable coil coupled to an actuator block supporting the head gimbal assemblies. Current is supplied through the coil to selectively operate and move the actuator block to align the head gimbal assemblies relative to predetermined data tracks of the discs. A typical magnet assembly includes upper and lower pole plates or backirons which are supported relative to the disc drive assembly in a spaced relation and include a magnet coupled thereto to define a flux gap therebetween. An energized coil moves in the flux gap between the upper and lower pole plates.

For proper operation of the voice coil motor, the magnets must be accurately aligned and assembled to upper and lower pole plates. Alignment of magnets on the pole plates may be measured for quality control. Measurement instruments may be used to measure alignment of magnets by measuring the distance between the transition zone of a magnet bonded to a pole plate and a reference point. However, in order to rely on such measurements for quality control, the measurement instrument must provide a relatively accurate dimension measurement. If the measured dimension is different from the actual dimension, then quality control is compromised. The present invention addresses these and other problems, and offers advantages over the prior art.

SUMMARY OF THE INVENTION

The present invention relates to an instrument for measuring alignment of a magnet relative to a pole plate for a voice coil motor of a disc drive. The instrument includes a base and a platform coupled to the base and adapted to support a plate for measurement. The platform includes a pin or platform hole and a set of incrementally sized pins is included. The set of incrementally sized pins have incremental diameter dimensions to provide a selection of pins for insertion through plate hole of the pole plate and platform hole. The selection of pins allows an operator to match the pin dimension with the actual plate hole dimension to limit movement of the plate and magnet during measurement to reduce measurement errors.

DETAILED DESCRIPTION OF THE PREFERRED EMBODIMENTS

Figure 1:
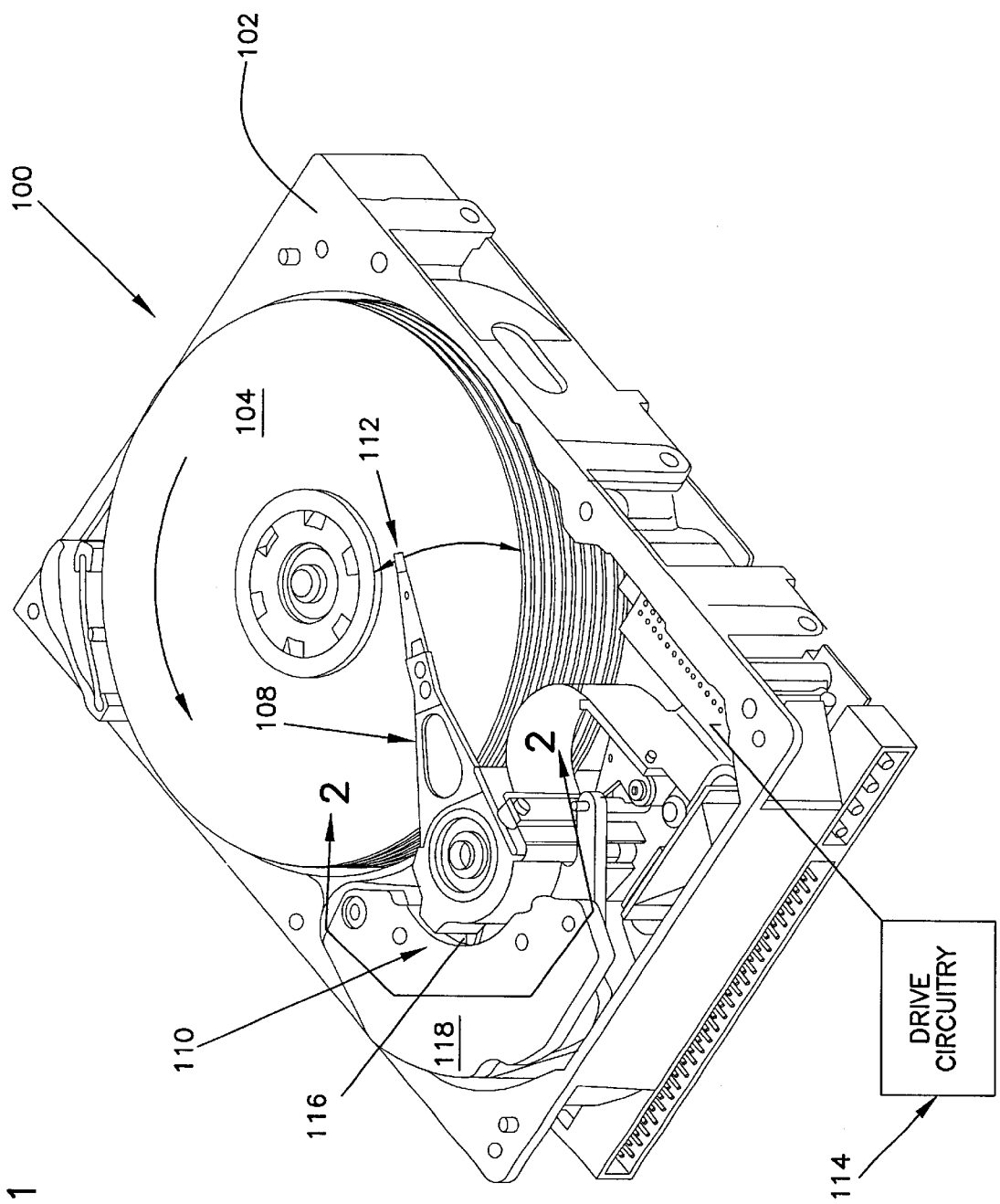
FIG. 1 is a perspective view of an embodiment of a data storage system.

The present invention relates to a system and apparatus for assembling components of a voice coil motor for a data storage device as illustrated in FIG. 1. As shown, the data storage device 100 includes a base 102, a disc stack 104, an actuator block 108, and a voice coil motor (VCM) 110. The actuator block supports heads 112 (only one is shown in FIG. 1) relative to the disc stack 104. The voice motor 110 is operably coupled to the actuator block for movement of the actuator block 108 along an arcuate path to position head 112 supported thereby relative to selected data racks. Operation of the voice coil motor 110 and head 112 is coupled to circuitry 114 of the disc drive.

Figure 2:
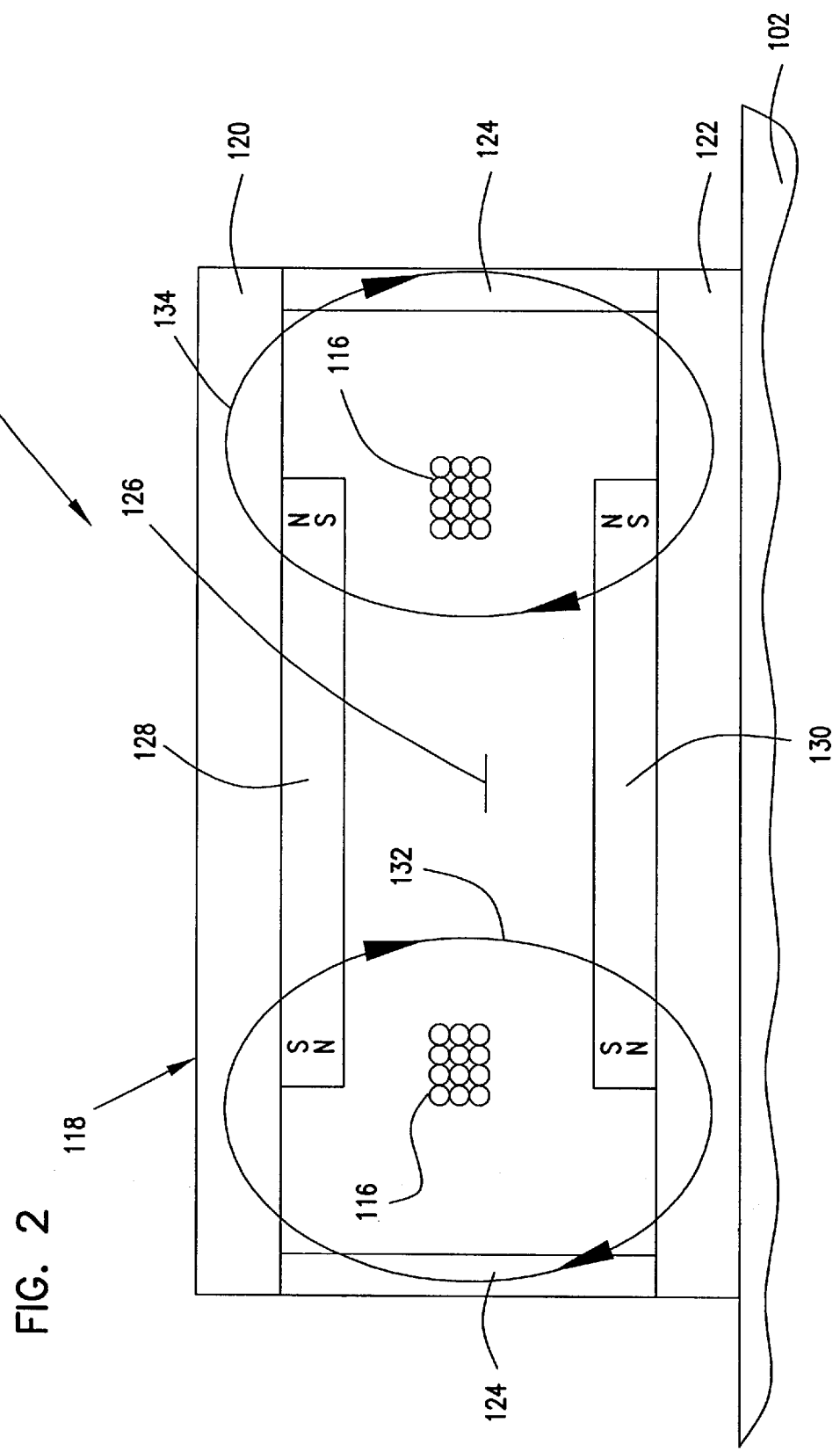
FIG. 2 is a cross-sectional view as taken long line 2—2 of FIG. 1.

FIG. 2 is a sectional view taken along lines 2—2 of the disc drive of FIG. 1 illustrating the VCM 110. The voice coil motor 110 includes an energizable coil 116 coupled to actuator block 108 and a magnet assembly 118 coupled to base 102 of the disc drive. In the embodiment shown, the magnet assembly 118 includes a plurality of pole plates 120, 122. Plates 120, 122 are supported in spaced relation via spacers 124 to form gap 126 therebetween. Magnets 128, 130 are supported by plates 120, 122 to form a permanent magnetic field in gap 126. In the embodiment shown, plates 120, 122 support bi-polar magnets 128, 130 to form bi-directional flux paths 132, 134 for operation of the voice coil motor. Coil 116 extends into the gap 126 in alignment with flux paths 132, 134 for generating a rotating force for operating actuator block 108 proportional to current flowing through the coil 116.

Figure 3:
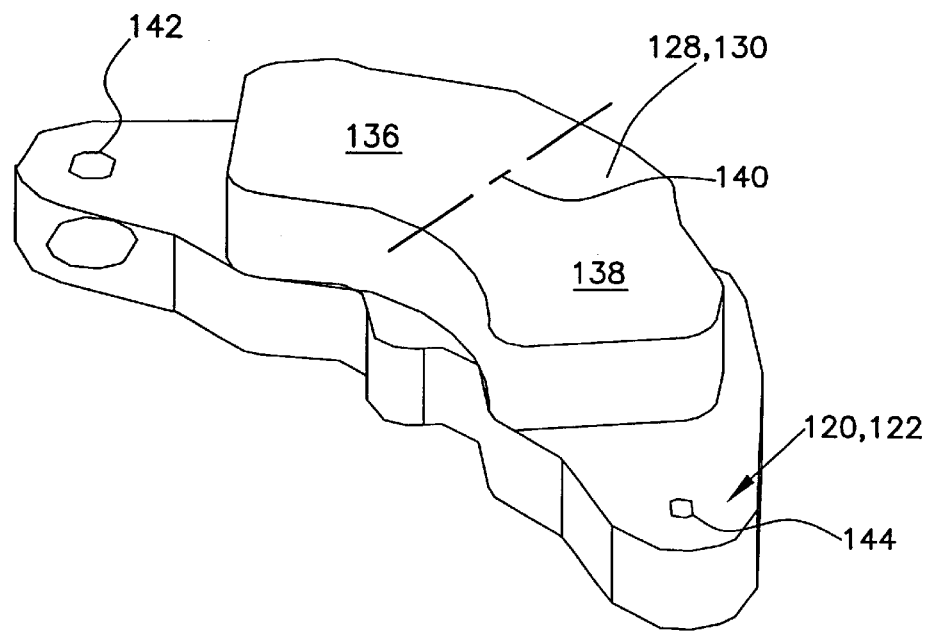
FIG. 3 is a perspective view of a pole plate and magnet.

FIG. 3 is a perspective view of an embodiment of pole plates 120, 122 having a magnet 128, 130 coupled thereto. In the embodiment shown, magnets 128, 130 include first and second magnetization regions 136, 138 separated by a transition zone 140 (shown illustratively) to form multiple flux paths 132, 134. In the embodiment shown, magnets 128, 130 are formed of a unitary structure however, the magnets 128, 130 are not limited to a unitary structure and may be formed of separate magnet portions. Spacers 124 are coupled to plates 120, 122 via fastener holes 142, 144 which couple plates 120, 122 to base 102 via fasteners (not shown).

For desired operation, it is important to accurately align magnets 128, 130 on plates 120, 122 so what coil portions are properly oriented relative to flux paths 132, 134 for rotating the actuator block 108 by energizing the coil 116. Magnets 128, 130 may be aligned relative to the transition zone 140 of the magnets 128, 130 and a reference point, for example, the fastener hole 142, 144 of the plate 120, 122 or other plate hole. Alignment of the magnets may be measured by measuring the distance from the transition zone 140 and fastener holes 142, 144 to verify proper placement of the magnets 128, 130 relative to plates 120, 122.

Figure 4:
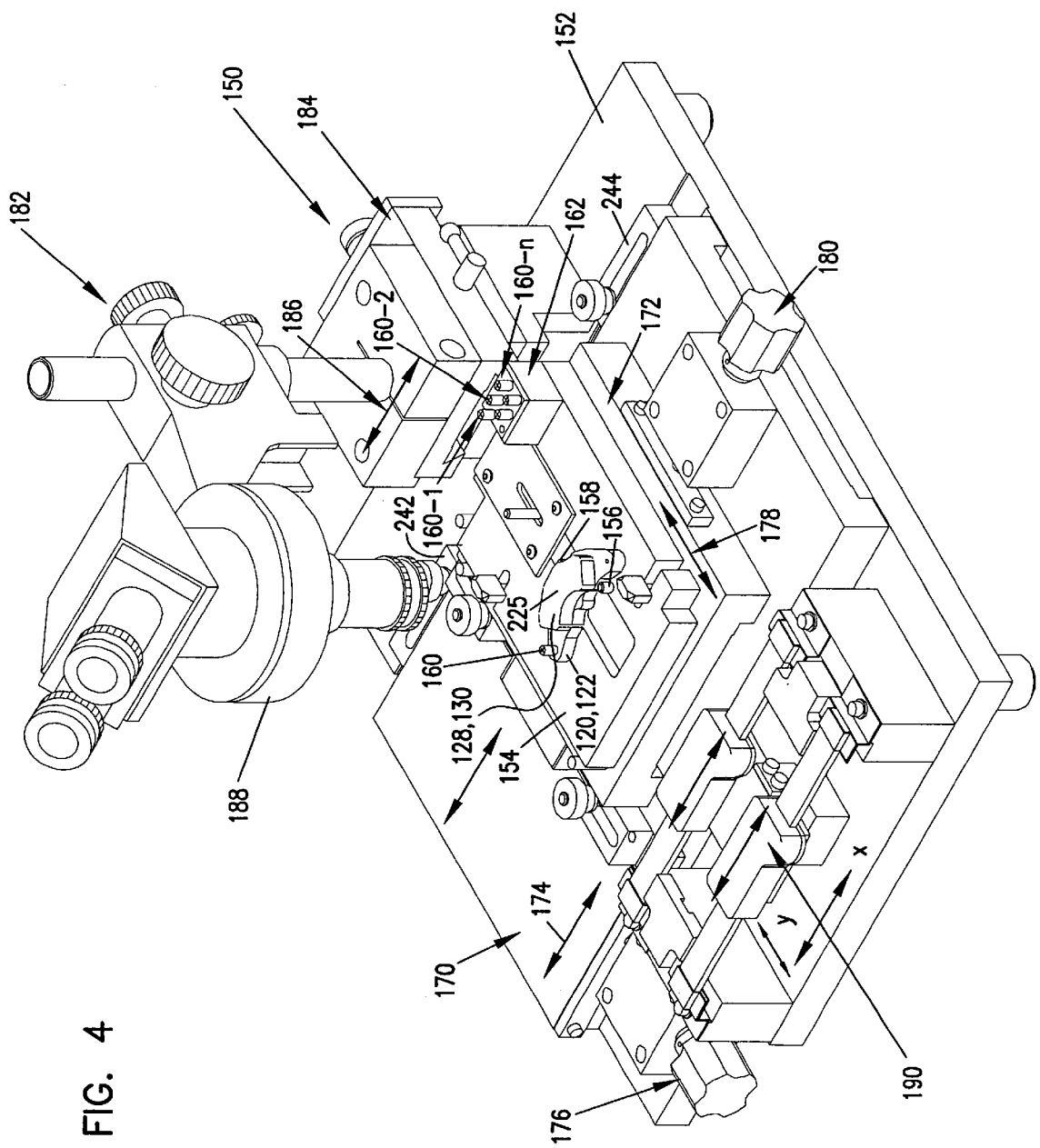
FIG. 4 is a perspective view of an embodiment of an alignment measurement device according to the present invention.

FIG. 4 illustrates a device for verifying alignment of magnets 128, 130 on plates 120, 122 for a voice coil motor 110. In the embodiment shown, device 150 includes a base 152 and a measurement platform 154. Plates are supported by platform 154 for measurement. Platform 154 has an x-y axis, and fixed post 156 and a movable post 158 which are adapted to secure plates 120, 122 relative to platform 154. Device 150 includes pins 160 which are sized for insertion through fastener hole 142 in plates 120, 122. For operation, pins 160 are inserted into hole 142 to secure plate 120, 122 relative to platform 154 and provide a reference position for measuring placement of the magnets 128, 130 on plates 120, 122. As shown device 150 includes a set of incrementally sized pins 160-1 through 160-n (where n is the number of pins provided in the set) as will be explained which are supported by pin block 162 coupled to platform 154 for use.

As illustrated, platform 154 is supported via a x axis table 170 and a y axis table 172. X-axis table 170 is movable along the x axis as illustrated by arrow 174 via a x axis adjuster 176. Y-axis table 172 is movable along the y axis as illustrated by arrow 178 via adjuster 180. Platform 154 is movably supported relative to base 152 along the x-axis and y-axis for operation as will be explained. As shown, device 150 includes a microscope 182 movably supported by scope support assembly 184 coupled to base 152 as illustrated by arrow 186. Microscope 182 includes a light 188 for illuminating platform 154 for locating reference points for measurement. Device also includes micrometers 190 operably coupled to platform 154 to measure movement of platform 154 for alignment measurements as will be explained.

Figure 5:
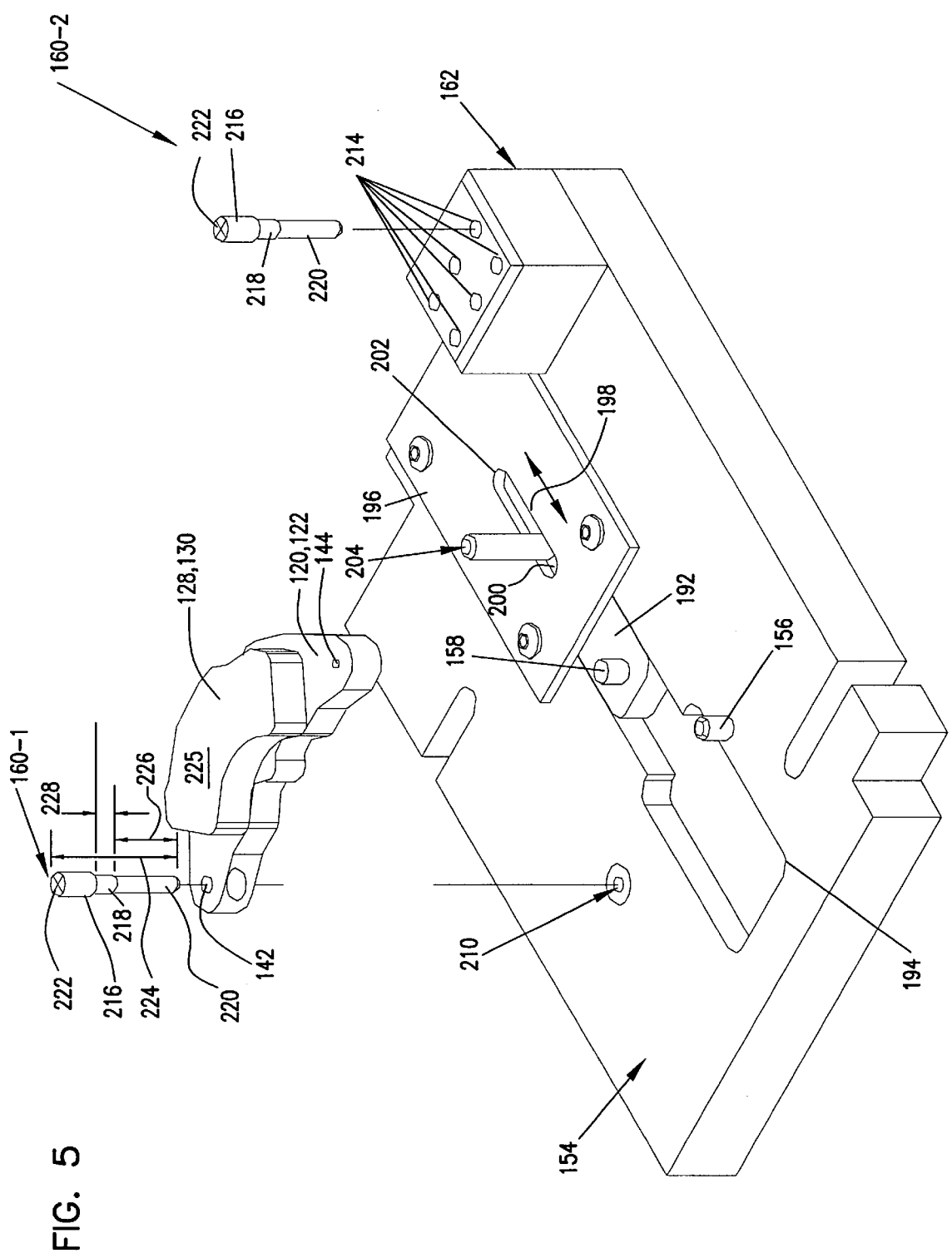
FIG. 5 is a perspective view of a platform supporting the plate for measurement of the embodiment of the device illustrated in FIG. 4.
Figure 6:
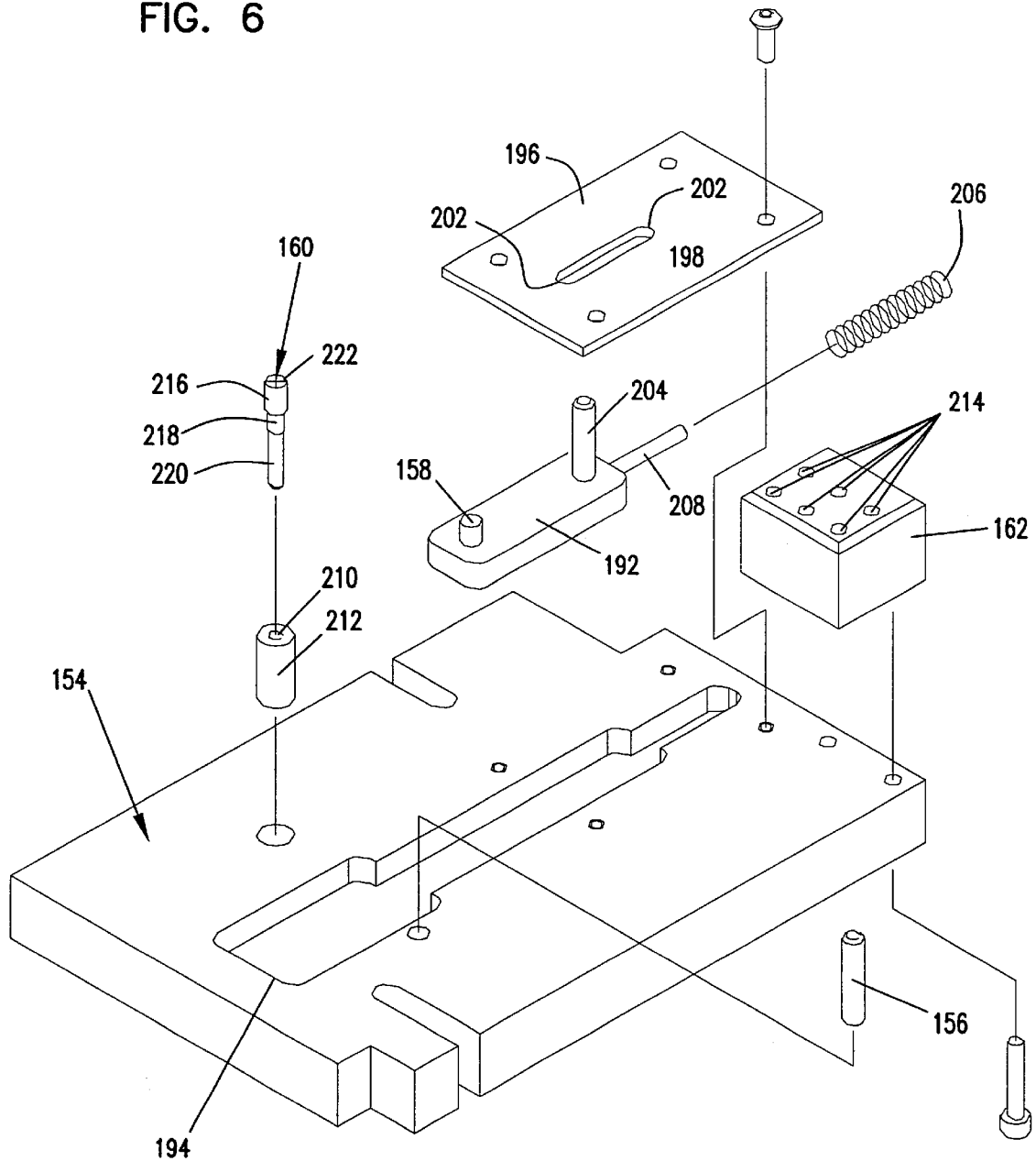
FIG. 6 is an exploded view of the construction of the platform illustrated in FIG. 5.

FIGS. 5–6 are detailed illustrations of platform 154 and pins 160. Movable post 158 is supported by block 192 movable within recess 194 on platform 154. Cover 196 secures block 192 within recess for movement therein. Plate 196 includes a slotted hole 198 having first and second ends 200, 202. Rod 204 is coupled to block 192 and extends through slotted hole 198. Block 192 is spring biased via spring 206 shown in FIG. 6 toward post 156. Spring 206 biases block 192 so that rod 204 contacts first end 200 of slotted hole 198 to define a forward clamping position of block 192 and post 158 supported thereby. In the forward clamping position, post 158 contacts a plate 120, 122 and biases plate 120, 122 toward post 156 to secure plate 120, 122 relative to platform 154 for measurement. Block 192 is forced against the spring bias by rod 204 to the second end 202 of slotted hole 198 to move post 158 to the retracted position to unload plate 120, 122 from platform 154. Spring 206 is supported about rod 208 coupled to block 192 to bias block 192 toward post 156.

As shown in FIGS. 5–6, platform 154 includes pin or platform hole 210 adapted to receive pin 160 inserted through a plate hole 142 of plate 120 supported on platform 154. Hole 210 is formed via bushing 212 (shown in FIG. 6) coupled to platform 154. Plate holes 142 on plates 120, 122 are manufactured within a predefined tolerance range thus, the actual dimensions of plate holes 142 varies from plate to plate. Variations in the plate hole 142 dimension changes the clearance between a fixed pin dimension and plate hole 142. A large clearance dimension between pin 160 and hole 142 allows movement of the plate 120 on platform 154 during measurement thus possibly degrading measurement accuracy. In the device of the present invention, a set of incrementally sized pins 160 are supported in holes 214 of block 162 for use. The set of pins includes pins of various diameter dimensions corresponding to the tolerance range variations of the plate hole 142. Thus, different diameter pins may be used depending upon the actual hole 142 dimension to reduce clearance and limit movement of the plate relative to platform 154 during measurement.

In a preferred embodiment, pin 160 is formed of a head 216, collar portion 218 and rod portion 220. Rod 220 is sized smaller than collar 218 and is sized similar to hole 210 on platform 154 for insertion through plate hole 142 and insertion in platform hole 210. Collar 218 is sized for insertion into hole 142 of plates 120, 122. Head 216 is sized larger than collar 218 and abuts an upper surface of plate 120, 122. Head 216 includes a cross-hair reference 222 for alignment. Collars 218 are incrementally sized corresponding to the tolerance dimension range of plate hole 142. Rod portion 220 has a fixed diameter for each pin of the set of pins for insertion into fixed dimension hole 210 on platform 154. The length 224 of pin 160 is sized so that an upper surface of head 216 with cross-hair reference 222 is aligned with or at the same elevation as an upper surface 225 of magnet 128, 130 for ease of operation as will be explained. The length 226 of rod portion 220 corresponds to the depth of platform hole 210 and the length 228 of collar 218 corresponds to the thickness of plate 120, 122 so that collar 218 is aligned relative to plate 120, 122 and rod portion 220 extends into hole 210.

In a preferred embodiment, the set of pins includes three pins having three incremental sized collars 218. The incremental sized collars 218 correspond to the smallest sized hole 142, 144, intermediate sized hole 142, 144 and largest sized hole 142, 144 within the hole tolerance range. For example, for a fastener hole dimension of 150 inches plus 0.005 inches minus 0.003 inches, the set of pins 160 includes a 0.155 inch collar; 0.151 inch collar and 0.147 inch collar. The incremental size range provides a range of collar sizes to limit clearance dimension variations. Preferably, as shown, multiple sets of pins 160 may be supported by pin block 162 for different plate models 120, 122 having different fastener hole sizes 142, 144.

Figure 7:
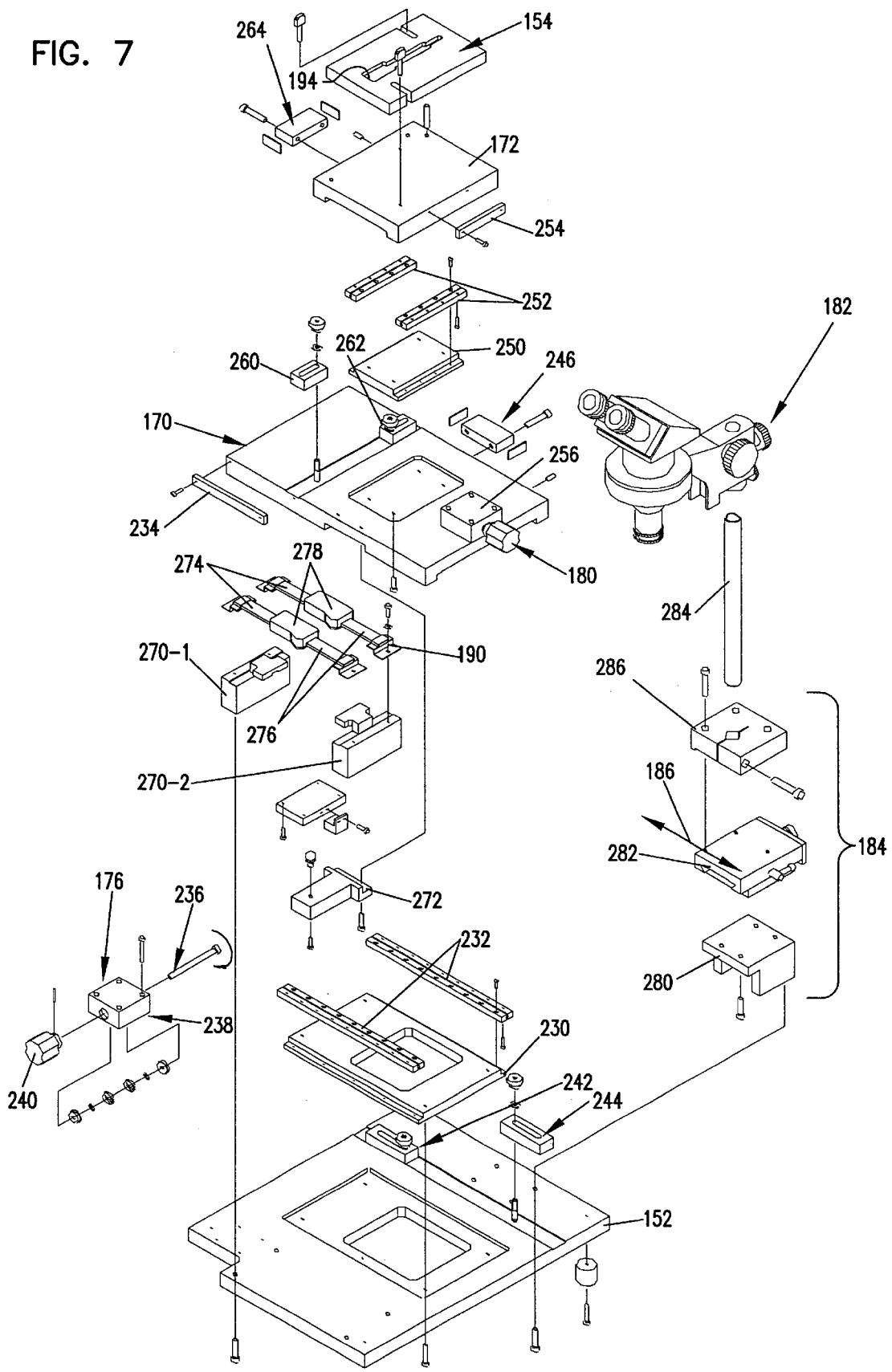
FIG. 7 is a detailed exploded view of the embodiment of the apparatus illustrated in FIG. 4.

FIG. 7 is an exploded view illustrating components of the apparatus. As shown, x axis table 170 is movably coupled to base 152 along a track including a track plate 230 supporting track rails 232 coupled thereto. X-axis table 170 is moved along track via operation of the x-axis adjuster 176. The x axis adjuster includes a rack 234 coupled to x-axis table 170 and a pinion 236 rotationally supported by pinion block 238. Pinion 236 is rotated via knob 240 coupled thereto to incrementally move table 170 via cooperative engagement of pinion 236 with rack 234.

Table 170 moves between blocks 242, 244 coupled to base 152. Table 170 includes travel block 246 coupled thereto and aligned to contact blocks 242, 244 to define the stroke for the x-axis table 170. The y-axis table 172 is movable coupled to the x-axis table via a track plate 250 coupled to table 170 and supporting rails 252. Y-axis table 172 moves along rails via cooperation of rack 254 and pinion (not shown). Pinion is rotationally supported via pinion block 256, to incrementally adjust the position of table 172. Stop blocks 260, 262 are coupled to table 170. Y-axis table 172 includes travel block 264 which is aligned with and cooperates with stop blocks 260, 262 to define the stroke of table 172.

As shown, micrometers 190 are supported via blocks 270-1, 270-2 coupled to base 152. Micrometers are operably coupled to x-axis table 170 via block 272 to measure the movement of the table 170. Micrometers include arms 274, 276 and a caliper base 278. Arms 274, 276 are fixedly coupled to blocks 270-1, 270-2 and caliper base 278 is coupled to block 272 and movable relative thereto. Block 272 is also coupled to x-axis table 170 and movable therewith. Thus, caliper base 278 moves relative to arms 274, 276 via movement of table 170 (and block 272) to measure x-axis movement of platform 154. Caliper base 278 includes a scale to measurement movement of the table 170 for alignment measurement. Microscope 182 is supported by scope support assembly 182 including a slide base 280 and a slide 282. Thus, the position of microscope 182 may be adjusted for proper alignment for measurement. The microscope 182 is coupled to slide 282 via rod 284 and block 286.

Figure 8:
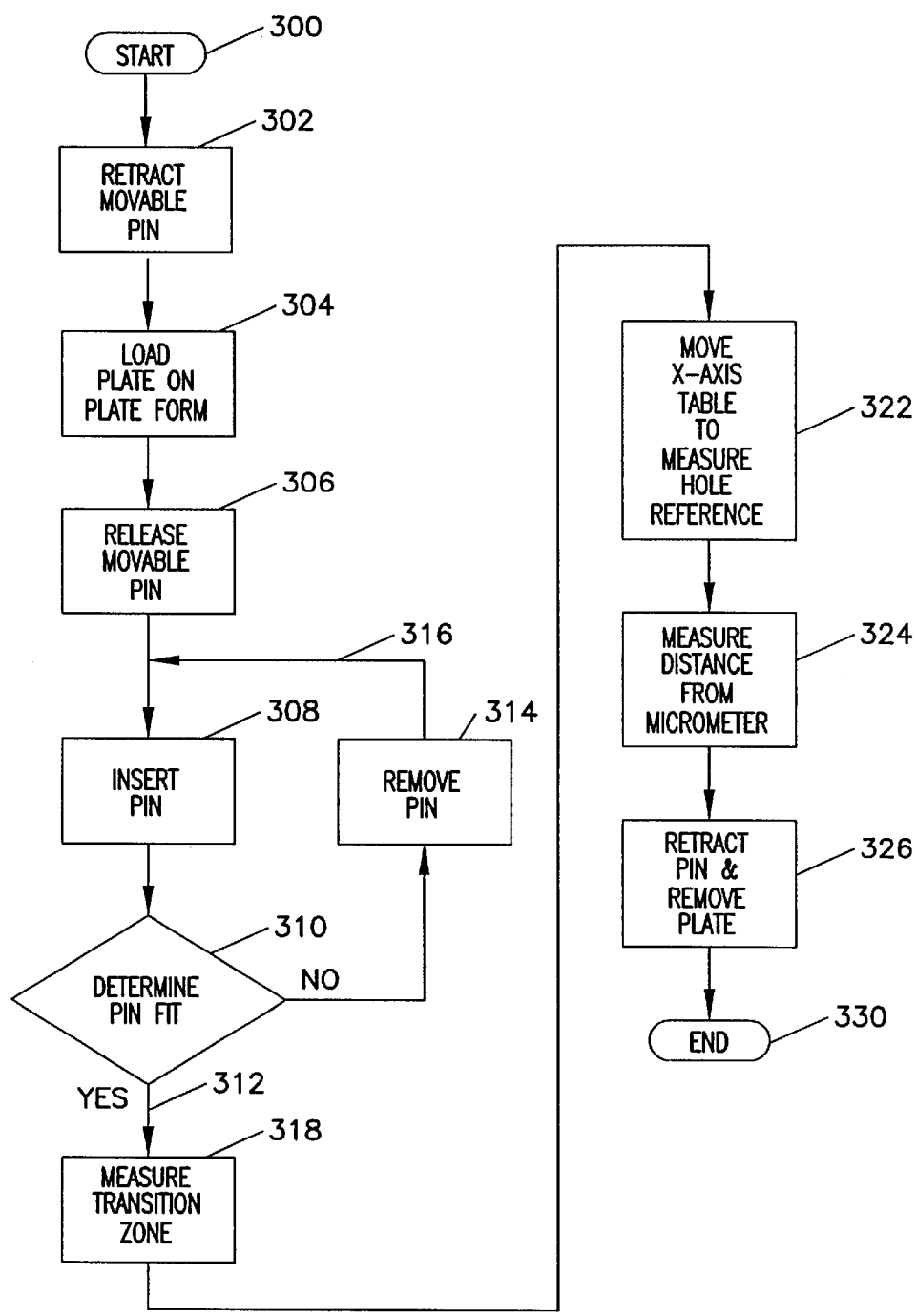
FIG. 8 is a flow chart illustrating operation of the embodiment of the apparatus illustrated in FIG. 4.

FIG. 8 is a flow chart illustrating operation of the embodiment of the device illustrated in FIG. 4. As shown, operation commences as illustrated by block 300. Preferably plate is secured via post 156, 158 and rod 204 is moved toward the second end 202 of slotted hole 198 to retract post 158 from post 156 as illustrated by block 302. A plate 120, 122 is loaded for measurement and orientated so that plate 120, 122 is biased toward post 156 as illustrated by block 304. Thereafter rod 204 is released so that post 158 is spring biased via spring 206 toward post 156 to contact and bias plate 120, 122 relative to post 156 to secure plate 120, 122 for measurement as illustrated by block 306.

A pin 160-1 is removed from block 162 and inserted into fastener hole 142 of supported plate 120, 122 as illustrated by block 308. The operator then tests the fit or clearance of inserted pin 160-1 to determine fit as illustrated by block 310. The operator tests the fit or clearance by testing movement of the plate relative to pin 160-1. If there is tight clearance or limited movement of plate 120, 122 then testing operation continues as illustrated by line 312. Otherwise pin 160-1 is removed as illustrated by block 314 and an alternately sized pin 160-2 is inserted as illustrated by line 316. The process is repeated to match the pin 160 dimension with the actual hole 142 dimension so that the closest sized pin 160 is inserted into hole 142 for measurement operations.

Once the plate is secured via posts 156, 158 and pin 160, preferably the microscope 182 or platform 154 is adjusted to align transition zone 140 for measurement. The position of transition zone is measured, as illustrated, by block 318 to define a base reference position. The position of the microscope 182 is adjusted via slide 282; and the platform 154 position is adjusted via movement of y-axis table 172 and movement of x-axis table 170. Preferably, the base reference position is measured by zeroing the micrometer 190.

The distance between the transition zone 140 and fastener hole 142 is then measured by moving the x-axis table 170 and y-axis table 172 to measure the cross-hair reference 222 on pin 160 extending into fastener hole 142 as illustrated by block 322. The quality control dimension is the difference between the base or first reference position and the second reference position aligned with pin 160 in hole 142. As previously explained, micrometer 190 is coupled to table 170 so that the movement distance of table 170 is measured by micrometer 190 to measure an elongated longitudinal distance between the transition zone 140 and fastener hole 142 as illustrated by block 324. After measurement is complete, post 158 is retracted to remove plate 120 as illustrated by block 326 and operation is completed as illustrated by block 330.

Figure 9:
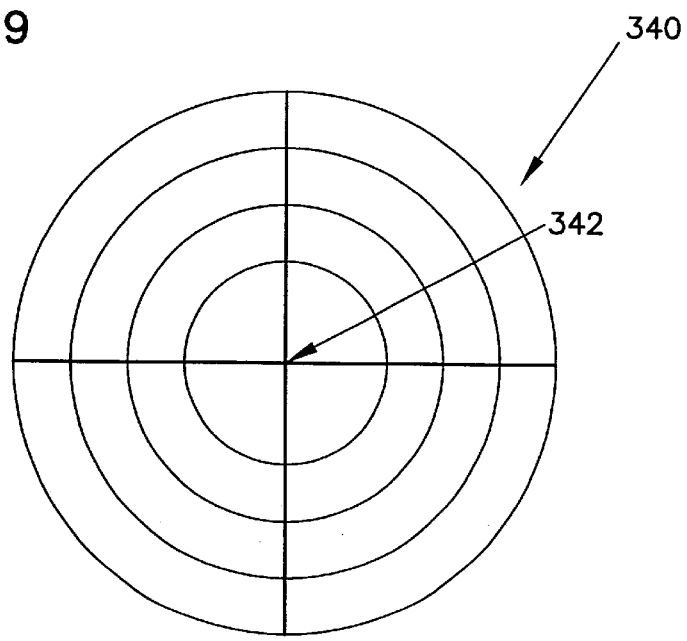
FIG. 9 is a illustrative view of reference marks in a lens of a microscope in an embodiment of the device illustrated in FIG. 4.

Preferably, the microscope 182 includes reference marks as illustrated in FIG. 9. As shown reference mark 340 includes a crosshair 342. Preferably, prior to measurement, transition zone 140 is aligned with crosshair 342 on microscope 182 and micrometer 190 scale is zeroed. Thereafter, platform 154 supporting plate 120 is moved (via movement of x-axis table 170 and y-axis table 172) to align crosshair 342 with the crosshair 222 on pin 160 for measurement as previously explained. As previously explained, the length dimension 224 of pin 160 is sized so that an upper surface of head 216 having cross-hair 222 is at the same elevation as the upper surface of magnets 128, 130 so that once the cross-hair reference 342 of microscope 182 is focused on transition zone 140 or other reference point, the microscope 182 does not need to be refocused to locate cross-hair 222 of pin 160 with reference cross-hair 342 of microscope 182. Preferably, the microscope may be a Meiji Unimac Microscope Model No. MA602-MS-3 from Meiji Techno Co. Ltd. having four focus adjustments. The microscope 182 is illuminated by a fluorescent light 188 as previously explained for locating reference points for measurement.

Thus, as described, the present invention relates to an instrument for measuring alignment of a magnet relative to a pole plate. In the embodiment of the device shown, the device includes a base 152 and a platform 154 coupled to the base and adapted to support a plate having a plate hole 142 extending therethrough for measurement. The platform 154 includes a hole 210 adapted to receive a pin inserted through the reference hole of plate 120, 122 supported via platform 154. The device includes a set of incrementally sized pins 160-1, 160-n having an incremental diameter size range corresponding to the tolerance dimension variations of the reference hole 142. Depending upon the actual fastener hole size, some pins may not extend through the hole. However, the set of pins includes one pin having a diameter corresponding to the lowest tolerance dimension hole 142 for insertion therein. The set of incrementally sized pins limits variations in the clearance dimension between pin 160 and hole 142 to reduce measurement error due to tolerance dimension variations of hole 142. The device of the present invention provides these and other advantages.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic data storage system, it will be appreciated by those skilled in the art that the teachings of the present invention can be applied to other systems, without departing from the scope and spirit of the present invention.

What is claimed is:
1. In combination:
an instrument to measure alignment of a magnet assembly relative to a pole plate including:
    a base;
    a platform coupled to the base and adapted to support the pole plate having a plate hole extending therethrough, and the platform including a platform hole;
    a dimension gauge to measure a distance dimension between reference points of the pole plate; and a set of incrementally sized pins each pin having a first uniform diameter portion at a first end and a second diameter portion at a second end and the first diameter portion of each pin having the same diameter dimension of similar dimension to the platform hole to fit into the platform hole and the second diameter portion of each pin having different diameter dimensions relative to the other pins and the different diameter dimensions being incrementally sized to correspond to tolerance dimension variations of the plate hole, at least one of the incrementally sized diameter dimensions being sized to correspond to a smallest tolerance dimension of the plate hole.

2. The combination of claim 1 wherein the set of incrementally sized pins includes:
at least three pins, one of said three pins having the second diameter portion sized to correspond to the smallest tolerance dimension of the plate hole, another of said three pins having the second diameter portion sized to correspond to an intermediate tolerance dimension of the plate hole and another of said three pins having the second diameter portion sized to correspond to a largest tolerance dimension of the plate hole.

3. The combination of claim 1 wherein a length dimension of each pin is sized relative to a length dimension of the platform hole so that an elevated height of an upper surface of each pin inserted into the platform hole and the plate hole is relatively similar to an elevated height of an upper surface of the magnet assembly coupled to the pole plate.

4. The combination of claim 1 wherein the platform includes a pin block supported thereby and the pin block includes a plurality of pin holes for storing the set of incrementally sized pins.

5. The combination of claim 1 wherein the platform is movably coupled to the base and comprises:
moving means for moving the platform relative to the base and the dimension gauge being operably coupled to the platform to measure the distance dimension between the reference points.

6. The combination of claim 5 wherein the moving means includes:
a first table movably coupled to the base along a first axis;
a second table movably coupled to the first table along a second axis generally perpendicular to the first axis, the platform being coupled to the second table; and
a first moving means for moving the first table along the first axis and a second moving means for moving the second table along the second axis.

7. The combination of claim 6 wherein the first and second moving means for moving the first table along the first axis and the second table along the second axis comprises:
a rack coupled to the first and second tables;
a pinion operably coupled to the rack, the pinion engaging the rack to move the first and second tables.

8. The combination of claim 7 wherein the first table is movable along the first axis which is a measurement axis and the dimension gauge is operably coupled to the first table to measure a movement distance of the first table along the measurement axis.

9. The combination of claim 1 and including a microscope for locating the reference points for measurement.

10. The combination of claim 9 wherein the microscope is movably supported relative to the base for adjusting a position of a lens of the microscope to locate the reference points.

11. The combination of claim 1 wherein one reference point of the pole plate is a transition zone of a magnet assembly supported on the pole plate.

12. The combination of claim 1 wherein one reference point of the pole plate is one of the incrementally sized pins inserted into the plate hole.

13. The combination of claim 12 wherein the inserted pin includes a cross-hair reference.

14. The combination of claim 1 wherein the platform further comprises:
a fixed pin extending from an upper surface of the platform; and
a movable pin coupled to the platform and operable between a retracted position and a clamping position, in the clamping position the movable pin contacting the pole plate aligned relative to the fixed pin and biasing the pole plate toward the fixed pin.

15. A method for measuring a distance dimension between reference points for verifying alignment of a magnet assembly relative to a pole plate having a plate hole for a voice coil motor for a data storage system comprising steps of:
(a) providing a measurement instrument including a platform coupled to a base and having a platform hole;
(b) providing a set of incrementally sized pins each pin having first and second diameter portions, the first diameter portions being uniformly sized for insertion into the platform hole and the second diameter portions having incrementally sized diameters corresponding to tolerance dimension variations of the plate hole, at least one of the incrementally sized pins being sized to correspond to a smallest tolerance dimension of the plate hole which can be inserted therethrough;
(c) loading the pole plate on the platform and aligning the plate hole relative to the platform hole;
(d) inserting the pins of the set of incrementally sized pins through the plate hole so that the first diameter portion is inserted in to the platform hole and identifying a pin with a smallest clearance dimension between the second diameter portion of the pin and the plate hole and using the identified pin with the smallest clearance dimension as an inserted pin; and
(e) measuring a distance between the inserted pin of the set of incrementally sized pins and a spaced measurement point.

16. The method of claim 15 wherein the platform is movably coupled to the base and a dimension gauge is coupled to the movable platform to measure a movement distance of the platform, and the step of measuring the distance between the inserted pin and the measurement point comprises the step of:
(f) zeroing the dimension gauge at one of the inserted pin or the measurement point; and
(g) moving the platform to the other of the inserted pin or the measurement point to measure the distance between the inserted pin and the measurement point.

17. The method of claim 16, and including a microscope coupled to the platform, the microscope including a reference mark and further comprising steps of:
(h) aligning the reference mark of the microscope with one of the inserted pin or the measurement point and measuring a first reference position; and
(i) moving the platform to align the reference mark of the microscope with the other of the inserted pin or the measurement point and measuring a second reference position to measure distance between the first and second reference positions.

18. The method of claim 15 wherein the measurement point corresponds to a transition zone of the magnet assembly supported by the pole plate.

19. An apparatus for aligning a magnet on a pole plate having a plate hole comprising:

a platform having a platform hole; and pins means insertable into the platform hole through the plate hole including means for compensating for tolerance dimension variations of the plate pole to support the pole plate on the platform for alignment measurement.

* * * * *